May 19, 1953  F. A. JONES  2,639,166
TRAILER TRUCK TANDEM AXLE SPRING SUSPENSION
Filed Jan. 30, 1950  3 Sheets-Sheet 1

INVENTOR
Frank A. Jones
BY Ralph L. Barrett
ATTORNEY

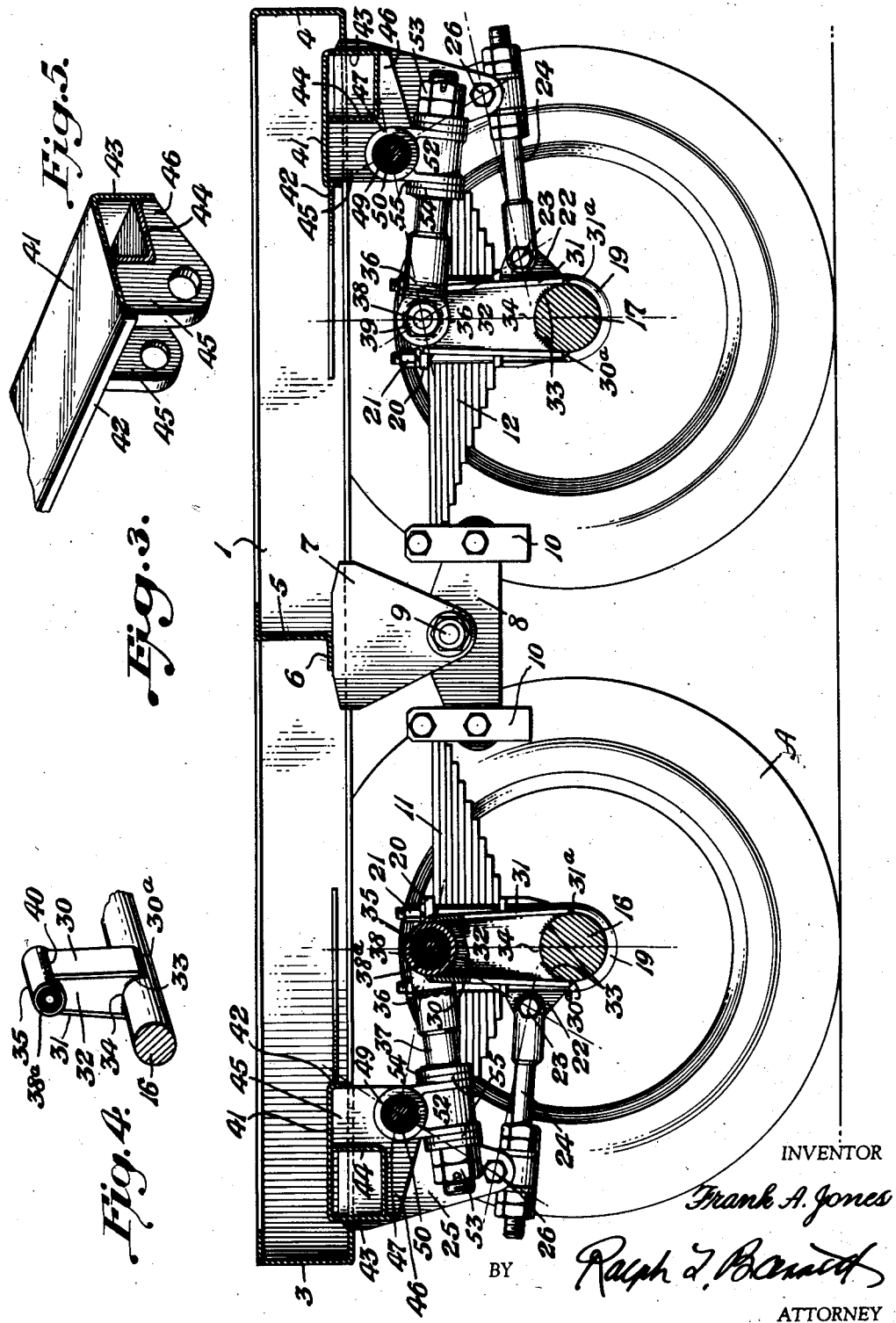

Patented May 19, 1953

2,639,166

UNITED STATES PATENT OFFICE 2,639,166

TRAILER TRUCK TANDEM AXLE SPRING SUSPENSION

Frank A. Jones, Bristol, Tenn., assignor, by mesne assignments, to Enterprise Wheel & Car Corporation, Bristol, Va.

Application January 30, 1950, Serial No. 141,185

5 Claims. (Cl. 280—104.5)

This invention relates to improvements in spring suspension for vehicles, particularly of the trailer type, wherein the greater weight is borne at the rear of the structure and obviously requires substantial support.

The present development comprehends an improvement in my prior Patent No. 2,446,877, patented August 10, 1948. In this structure a twin axle truck is provided, the truck including the usual frame with suitable wheel arrangements and springs arranged in pairs at each side of the axle, the springs being connected at their adjacent ends by an equalizer through suitable shackles and the outer ends of the springs being freely mounted to complete the suspension. In my prior Patent No. 2,446,877 a radius rod is provided which is pivotally supported between the axle and the frame, the purpose of the rod being to maintain under load conditions an alignment of the axles to save wear and tear on the tires and decrease to the minimum required power for haulage. In this prior structure, it has been found that when the brakes are applied the brake torque acting in the same direction as the wheels rotate, due to the assembly, tends to shift more load on the rear axle. This shifting of the load under braking conditions causes the forward axle to lift upwardly, resulting in a "hopping" off of the ground of the forward wheel and axle assembly.

It is the object of the instant invention to prevent the shifting of the load conditions during braking operations whereby the tendency of the forward axle to lift or "hop" will be eliminated and the forward tires will be constantly maintained in uniform ground-engaging condition.

More specifically, the invention comprehends the use in a tandem trailer assembly of an adjustable torque rod between the axle and the frame, the arrangement of the torque rod being such as to oppose the torque forces created upon the application of the brakes, it being understood that these torque rods may be provided for both of the axles to prevent the "hop" of the axles regardless of the direction of movement of the truck during the time of the application of the brakes and under which conditions the undesirable forces are present.

Another object of the invention is to provide a structure of the type in question in which the various parts are designed for application to standard truck equipment of the tandem type, whereby installations may be made without unnecessary modification and expense.

Other objects of this invention will more clearly hereinafter appear by reference to the accompanying drawings and specification, wherein like characters of reference designate corresponding parts throughout the several views, in which:

Fig. 3 is a longitudinal section;

Fig. 4 is a perspective view showing the axle torque bracket; and

Fig. 5 is a perspective view showing the torque rod outer support.

Figure 2:
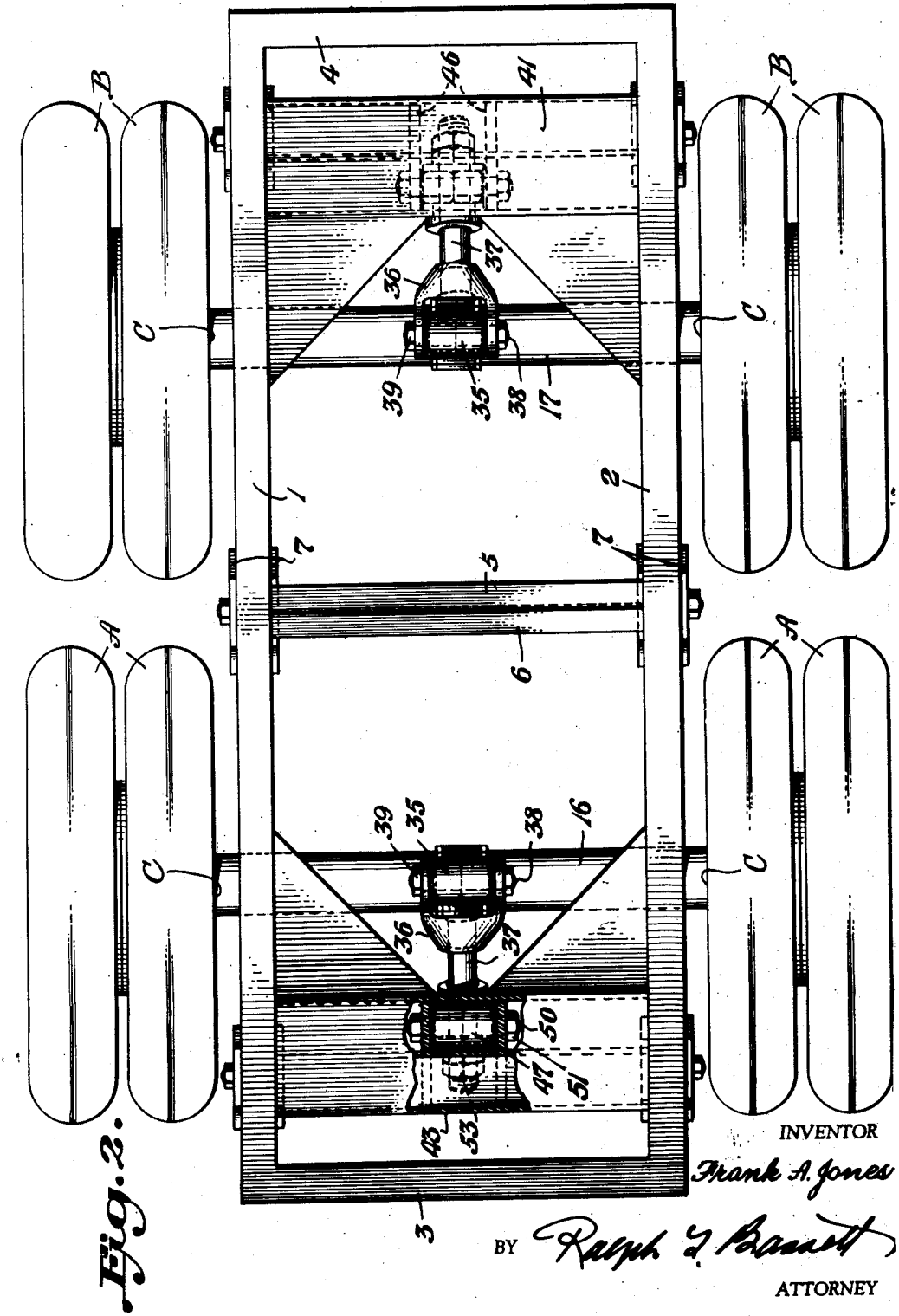
Fig. 2 is a top plan view.

It is to be understood that the present application merely illustrates the sub-frame forming the suspension means for the tandem assembly illustrating the present invention. The sub-frame includes longitudinal side frame members 1 and 2 and connecting end frame members 3 and 4. This frame member is formed of channel structures with the channel facing inwardly and a medial transverse brace 5 is illustrated, this brace being of Z-form with the upper flange lying in the plane of the upper flanges of the channel structure. The lower flange 6 of the Z-bar is positioned above the lower flange of the channel structure of the main frame to provide room for the hangers 7 which support the equalizing beams 8 by means of the cross rod 9 in the usual manner. As will be obvious from an inspection of Fig. 2, the equalizing beams 8 are provided beneath each of the side frame members 1 and 2 and medially of their length. The equalizing beams 8 are supported by means of shackles 10, the forward leaf spring assembly 11 and rear leaf spring assembly 12. The outer ends of the leaf spring assemblies 11 and 12 normally bear against the depending stools 14 which have lower rounded bearing faces and have their upper end portions 15 flared outwardly and welded to the bottom flanges of the frame structure. The springs are supported on the axles 16 and 17, resting on the saddles 18 in the usual manner, and this spring structure is secured to the axles by the U-bolts 19 which are arranged in pairs at each side of the springs and by means of clamp plates 20 and nuts 21 which maintain the parts in assembled position. Each saddle 18 is provided at its outer face with a projection or ear 22 which is formed with a transverse opening for the reception of bolts or pins 23 to which are hinged the radius rods 24, these rods being supported at their outer ends by hangers 25 which are formed with transverse openings for the reception of the bolts or pins 26, as is conventional in such assemblies.

By means of the heretofore described spring suspension it will be apparent that positive alignment of both axles may be and is secured by proper adjustment of the radius rods, and this alignment is maintained under all load and road conditions. The result of this structure is the elimination of any possibility of misalignment of the tandem axles which inherently results in a suitable increase in tire life and better trackage.

In addition to the foregoing structure, applicant provides a mechanism for maintaining the forward axle against an inherent tendency to lift vertically or "hop" under braking conditions. This mechanism includes a torque rod for each axle and placed medially thereof, projecting outwardly and secured at their outer ends to hangers hereinafter described. The torque rods are pivotally connected at their inner ends to axle torque brackets, each of which includes side plates 30 and 31 and end plates 32. The side plates 30 and 31 are welded at their edges 30ᵃ and 31ᵃ to the outer longitudinal faces of the axles, substantially medially of their vertical diameter and extend upwardly to a point approximating the upper plane of the leaf springs for each axle assembly. End plates 32 of the axle torque brackets are connected to the outer longitudinal edges of the side plates 30 and 31 by welding and have lower arcuate end portions which rest upon the upper face of the axles and these arcuate plates are welded at outer spaced portions at 33, the intermediate portion 34 (see Fig. 3) being left unwelded and therefore disconnected from the axle. The upper end portions of the end plates 32 are shaped to arcuate form to receive the steel tubing 35, which tubing sections are cradled thereby and project slightly beyond the end plates to provide clearance for supporting the Y terminal 36 of the torque rod 37, the latter being hinged on the hinge pins 38 and being adjustably secured in position by the nuts 39. The hinge pins 38 are of less diameter than the tubing 35 and a rubber connection 38ᵃ is provided between the pin and the tubing to add resiliency to the structure, it being understood that the rubber connection or bushing between the pin and the tubing may be assembled in shear with these parts. It will be noted that the upper ends 40 of the side plates are connected to the tubing 35 by a fillet weld and that the bracket assembly is of box construction to provide the essential strength and inherent resiliency to absorb the torque at this point.

The outer end of each of the torque rods 37 are suspended from flanged box girders forming transverse truck frame braces by means of depending hangers. The girders are each formed of inverted channels including the base portions 41, inner depending flange 42, and outer relatively wide depending flange 43. The flange 43 is associated with the angle member 44 to complete the box section of the channel, this angle member 44 being of such dimension as to extend about midway of the channel base 41, and the outer leg 43 of the channel is of such width as to extend downwardly beyond the box structure. This brace structure at each end of the truck frame not only braces the frame but provides parts which cooperate with depending hangers which support the outer ends of the torque rods 37. The hangers for the outer ends of the torque rods 37 are formed to include a pair of spaced L-shaped plates, the uprights 45 of the plates extending transversely between the channel flange 42 and the inner vertical wall of the angle member 44. The horizontal outwardly extending legs 46 of the L-plates are welded to the bottom of the box section of the girder as formed by the angle plate 44. The spaced L-shaped hanger plates are formed with transversely aligned opening to receive the tubing section 47 which contains the cylindrical rubber bushings 49, the latter enclosing the pins 50 and clamped by nuts 51 to the outer faces of the L-plates. The pins 50 form fixed pivots about which the tubing section 47 swings on the rubber mountings which are preferably in shear as regards the rotated parts. The tubing section 47 supports the torque rod support or stirrup 52, the rod extending through this support and being adjustably secured therein by the nuts 53 threaded and locked at the end of the rod 37 and operating to clamp the stirrup 52 against the stop members 54. Washers 55 are interposed at each side of the stirrup to facilitate the adjustment of the rod.

Detailed perspectives of the axle torque bracket and the hanger assembly are shown in Figs. 4 and 5 and it will be noted that in both instances the structures are fabricated from stock material with fillet welds at such points as may be advisable to provide the necessary strength to support the load and absorb the torque which may be present when the assembly is in use.

Figure 1:
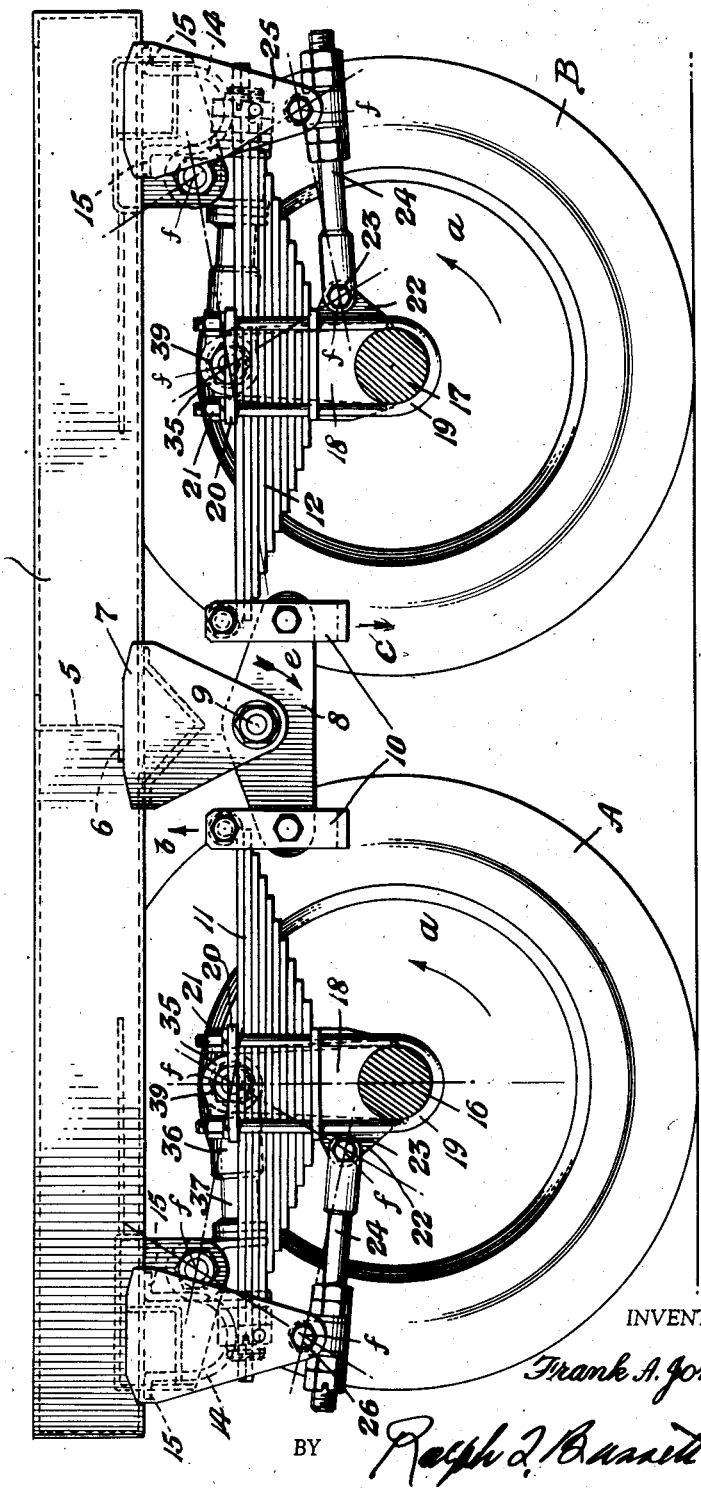
Fig. 1 is a side elevation, partly in section, of a suspension structure for a trailer or similar road vehicle.

By reference to Figs. 1 and 3, it will be noted that the axes $f$ of the supports for the torque rods 24 and 37 in each instance forms the points of a parallelogram, thus maintaining a symmetrical equilibrium in movement during operative conditions.

In the present disclosure dual wheels are shown at each end of each axle, the front wheels being indicated by reference character A, while the rear dual wheel assemblies are indicated by reference character B, and as is customary in such wheel assemblies the brakes in the present instance are arranged intermediate the wheel assemblies and are indicated by reference character C. In Fig. 1 the direction of rotation of the wheels is indicated by the arrows $a$. Upon application of the brakes, the brake torque acts in the same direction as the wheel rotation, this rotation being upwardly as indicated by arrow $b$ at the forward end of the equalizing beam 8 and downwardly at the rear end of the equalizing beam 8 as indicated by arrow $c$. Thus the equalizing beam 8 rotates as indicated by arrow $e$ tending to shift more load on the rear axle 17 and causing the forward axle 16 to lift or "hop" off of the ground. Obviously when the brakes are applied and when the present brake torque rods are used, the brake torque load is absorbed, as the brake torque rods prevent the tendency of the axle rotation which causes the "hopping" of the axle. By utilizing brake torque rods as illustrated in the present application, this undesirable "hopping" of the rear axle is prevented regardless of the forward or rearward movement of the truck. By the present construction and arrangement of parts, a new and desirable result has been obtained which heretofore has resulted in considerable wear and damage to the truck parts and has caused a rough and unsatisfactory handling of trucks under load conditions and particularly during the time of the application of brakes. It is understood that the present invention is applicable in any assembly, regardless of the type of brake used, the brake per se forming no part of the instant invention, which compensates for any braking action of any type of brake when applied to wheels mounted on fixed axles, as shown and described.

It will be understood that changes in details of construction and arrangement of parts may be made without parting from the spirit of the invention, which comprehends the absorption of the torque load by the means shown during application of the brakes.

What I claim is:

1. In a twin axle truck, a frame, a pair of wheel carrying axles spaced in parallelism across said frame, brakes for said wheels, leaf spring assemblies arranged in aligned pairs at each end of said axles, each pair of leaf springs having their adjacent ends pivotally connected to the end portions of a medially pivoted equalizing beam, and the outer end of said spring being free and operating against stool members located outward of the axles, said springs being supported medially of their length upon the tops of said axles, radius rods pivotally connected to the frame and to the axles adjacent and below the outward ends of said springs to maintain the axles in alignment, torque brackets mounted upon and fixed to the medial portion of the axles and extending above said springs, and torque rods each pivotally suspended from the end portion of the frame outward of the axles and pivotally mounted at the upper end portion to a torque bracket, and lying in planes above the springs and radius rods, and being constructed and arranged to absorb the brake torque load by opposing rotational movement of the axle during brake loading.

2. The structure of claim 1 characterized in that the torque bracket mounted upon and fixed to the axle is fabricated to provide front and rear converging walls and side walls, the side walls being shaped to receive the pivotal connection of the torque rod.

3. The structure of claim 1 characterized in that the truck frame is provided with additional cross braces of flange box girder construction, and the hangers for the outer ends of the additional torque rods include a pair of spaced plates having their upper edges shaped to conform to the cross braces.

4. In a track structure including wheels and axles, brakes for said wheels, a truck frame including side and end members, braces connecting the side members adjacent each end, said braces being of flange box girder construction with the box structure of the girders positioned outwardly, spaced angle members suspended from the bottom face of the girders and having resilient pivotal pin connections therebetween, torque rods having their outer end portions connected with said pins for resilient pivotal movement thereon, torque brackets mounted on the axles and extending substantially above the same, and resilient pivotal connections between the upper portions of the torque brackets and said torque rods.

5. In a twin axle truck, including a rectangular frame, a pair of wheel carrying axles arranged in spaced parallelism across the frame, brakes for the wheels, leaf springs arranged between each end of each of the axles and the frame, the adjacent ends of said leaf springs having pivotal connections to the end portions of a medially pivoted equalizing beam and the outer ends of said springs being free and operating against stool members, torque brackets rigidly secured to and extending substantially above the axles and medially of their length, torque rods pivotally connected to the upper portion of the torque brackets at their inner ends and pivotally connected at their outer ends to the truck frame at a point above the inner torque bracket connection to prevent rotational movement of the axles upon application of braking forces to the brakes.

FRANK A. JONES.

References Cited in the file of this patent

UNITED STATES PATENTS

| Number | Name | Date |
|---|---|---|
| 1,946,060 | Buckendale | Feb. 6, 1934 |
| 2,417,690 | Keller, Jr. | Mar. 18, 1947 |
| 2,446,877 | Jones | Aug. 10, 1948 |
| 2,496,428 | Avila | Feb. 7, 1950 |